Oct. 12, 1948.   H. R. RAFTON   2,451,448
TREATMENT OF PIGMENT COMPRISING CALCIUM CARBONATE
Filed April 11, 1947
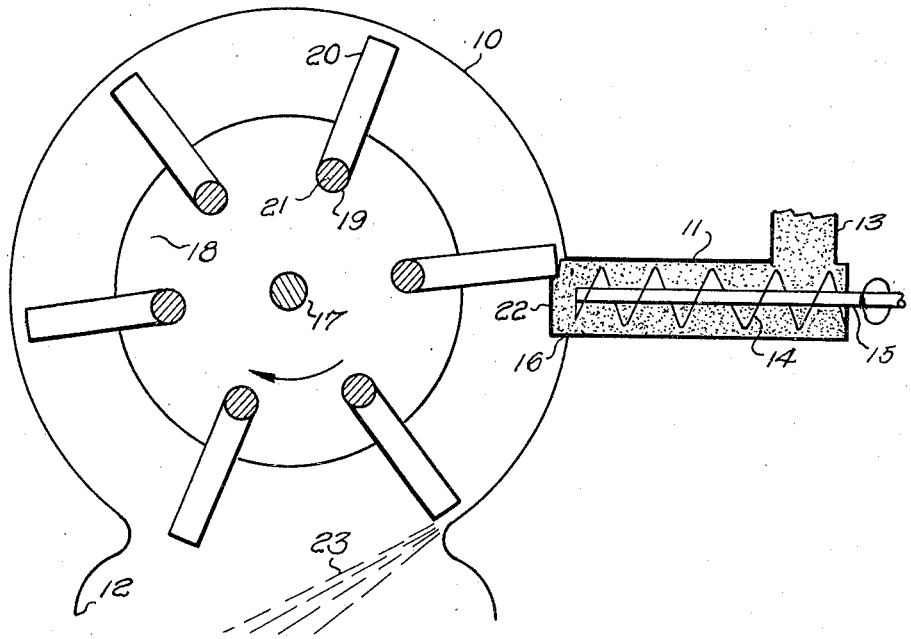
Inventor
HAROLD R. RAFTON
By
Attorney Patented Oct. 12, 1948

2,451,448

UNITED STATES PATENT OFFICE 2,451,448

TREATMENT OF PIGMENT COMPRISING CALCIUM CARBONATE

Harold R. Rafton, Andover, Mass., assignor to Raffold Process Corporation, a corporation of Massachusetts Application April 11, 1947, Serial No. 740,831

12 Claims. (Cl. 23—66)

My invention relates to the treatment of pigment, particularly calcium carbonate and more particularly artificially prepared calcium carbonate.

The present application is a continuation in part of my copending application Serial No. 453,469, filed August 3, 1942, now abandoned. Further reference is made to my copending cases, Ser. No. 706,907, filed October 31, 1946, and Ser. No. 718,649, filed December 27, 1946, now Patent No. 2,447,532, issued August 2, 1948; to prior filed cases Ser. No. 449,492, filed July 2, 1942, now abandoned; Ser. No. 455,367, filed August 19, 1942, now abandoned; and Ser. No. 584,158, filed March 22, 1945, now abandoned; and to my Patents 2,383,509 and 2,385,379, all directed to related subject matter.

The principal object of my invention is the treatment of a pigment, particularly calcium carbonate and more particularly artificially prepared calcium carbonate, to impart specific and controlled characteristics.

Other objects and advantages of this invention will become apparent during the course of the following description.

Calcium carbonate may be artificially prepared in a variety of ways, all of which are well known. Examples of some of the common methods are: by reaction of lime, or calcium hydroxide, and carbon dioxide; by the causticizing reaction, e. g., the reaction of sodium carbonate and lime; by the reaction of an alkali metal carbonate such as sodium carbonate and a soluble calcium salt such as calcium chloride; by the elimination of carbon dioxide from calcium bicarbonate solution by heat or reduction of pressure, or by reaction of calcium bicarbonate with lime; or by any combination of the above. Sodium bicarbonate is sometimes utilized in the reaction, as is also potassium or ammonium carbonate, and sodium, potassium or ammonium hydroxide may be present in certain cases. When I speak of artificially prepared calcium carbonate, I mean calcium carbonate artificially prepared by the above mentioned or other known methods in contradistinction to naturally occurring calcium carbonate such as marble, limestone, natural chalk, marl, or refined forms of these materials such as the comminuted form, usually ground to varying degrees of fineness, and which may be subjected to mechanical, air or water separation or classification, and may be otherwise purified if desired.

The calcium carbonates artificially prepared vary considerably in physical characteristics and possibly also in chemical constitution and crystalline form or other form. Some may be relatively coarse in particle size, others may be relatively fine, examples of the latter being the calcium carbonates made by the processes disclosed in the patents issued to Rafton and Brooks, No. 2,058,503, of October 27, 1936, and No. 2,062,255, of November 24, 1936. In many instances a given artificially prepared calcium carbonate, although entirely satisfactory from the standpoint of certain characteristics such for example as particle size, alkalinity, softness and the like, may be unsatisfactory because of high adhesive requirement, high oil absorption, or other characteristic. In many cases such unsatisfactory characteristic makes it infeasible, if not impossible, to market an artificially prepared calcium carbonate otherwise satisfactory or highly desirable for certain uses, or if possible to market it at all, only at a price lower than it would otherwise command.

As disclosed in my copending application Serial No. 346,661, filed July 20, 1940, now matured into Patent No. 2,385,379, issued September 25, 1945, I have discovered that by the momentary application of pressure, in certain cases accompanied by momentary attrition, I am able to impart to artificially prepared calcium carbonate certain new and in some cases unique characteristics, such as lowered oil absorption, lowered adhesive requirement and the like.

As disclosed in my copending application Serial No. 436,196, filed March 25, 1942, now matured into Patent No. 2,383,509, issued August 28, 1945, I have also discovered that by the passage of artificially prepared calcium carbonate at high velocity through a nozzle and if desired against a target, I am also able to impart to artificially prepared calcium carbonate similar new characteristics.

As disclosed in my copending application Serial No. 449,492, filed July 2, 1942, for which my continuation application Serial No. 718,649, filed December 27, 1946, has now been substituted, I have also discovered that by striking a liquid which comprises pigment comprising calcium carbonate with a striking surface of a rotor element having a velocity of not less than substantially 30' per second, I am also able to impart to said pigment similar new characteristics.

In my above referred to Patent No. 2,385,379, I have described the application of the process thereof to dry material, to somewhat moist material, to material in paste form, and even to material in the form of a slurry, the application of the process to material in the two latter forms being much more difficult. The process claimed in my above referred to application Serial No. 718,649, as well as the process claimed in my above referred to Patent No. 2,383,509, on the other hand, are both particularly applicable to aqueous slurries of artificially prepared calcium carbonate, but become increasingly difficult of operation as the water content of the artificially prepared calcium carbonate is decreased below certain limits, e. g. as the material approaches the paste-like condition; and as a matter of fact, my preferred method of operating my process claimed in my copending application Serial No. 718,649, as well as the process claimed in my Patent No. 2,383,509, is on an aqueous slurry, preferably as thick as may flow or as it may be feasible to pump. Thus it is seen that if the pigment is in paste form it may be treated only by the process of my Patent No. 2,385,379, and then only by special provision. It is therefore very desirable to have a process much simpler and more economical to operate for pigments comprising calcium carbonate when they exist in paste form.

Such a process I have devised, and I disclose it herein. By my process I am able to reduce greatly the adhesive requirements of artificially prepared calcium carbonates, when used, for example, in coated paper or in water paints. By my process I am also able to reduce the oil absorption of artificially prepared calcium carbonates, when used, for instance, in paints, enamels and other coatings, and putties; and in general I am able to impart greatly improved qualities to artificially prepared calcium carbonates. By my process I am also able to reduce the adhesive requirements and oil absorption of naturally occurring calcium carbonates, and also to modify certain other of their properties. The methods of testing for adhesive requirement and oil absorption of the pigment are those customarily used in the art, and are mentioned in my above referred to copending application, to which cross reference is hereby made.

My process lends itself particularly to incorporation in the operation of manufacturing artificially prepared calcium carbonate, inasmuch as in many cases the calcium carbonate after manufacture exists in the form of a paste such as a filter cake, or in the form of a slurry which can be readily converted into a paste as by filtration. Furthermore, in certain instances, there may be a point in the manufacturing operation in which artificially prepared calcium carbonate, after it has been produced, may be present in a somewhat crude form, as a paste or convertible to a paste, requiring subsequent refining, purification or the like. It is thus very often entirely feasible to incorporate my process as a step in the operation at some such point after the artificially prepared calcium carbonate has been formed. It is to be understood, however, that the usefulness of my process is not limited thereto, as of course artificially prepared calcium carbonate previously made, existing, for example, either in dry, paste or slurry form, can be treated by my process, of course, if in dry or slurry form, only after being converted to paste form.

Artificially prepared calcium carbonates of all degrees of fineness respond to my process claimed herein, from coarse particle size through varying degrees of fineness up to such fineness that they may be said to approach or be in the colloidal condition. Naturally, however, the absolute magnitude of the effect obtained is not the same or even similar with every sample. Pigments which contain artificially prepared calcium carbonate together with an additional constituent or constituents such for example as calcium carbonate magnesium hydroxide and calcium carbonate magnesium basic carbonate also respond to my process, as does naturally occurring calcium carbonate, such as limestone, marble, marl and chalk, for example in comminuted form such as they occur commercially, as well as pigment comprising naturally occurring calcium carbonate, in which there is an additional constituent or constituents present, such as magnesium limestone or dolomite, in finely divided form; although these naturally occurring materials do not appear to be affected by my process to as great a degree as are pigments comprising artificially prepared calcium carbonates.

My process comprises striking a paste of pigment comprising calcium carbonate with a rotor element provided with striking surface or surfaces, i. e. with a member or members adapted for striking. The rotor element preferably rotates at high speed. In my copending application Serial No. 718,649 wherein a slurry was employed, I could present that slurry to the striking surface or surfaces of the rotor element either in bulk form or in the form of a jet issuing from a nozzle, preferably at considerable speed. Likewise, in the present process, I may present my material to the striking surface or surfaces of the rotor element in bulk form or in shaped form, e. g., as a kind of extruded jet, but because material in paste form possesses considerable inertia and lacks mobility compared with a slurry, certain precautions are desirable in handling. It is in most cases not desirable to present paste material in bulk form to a rotor element as by immersion of the the rotor element wholly or in substantial part in the paste, among other reasons because of very high power requirements and in certain cases because of difficulty of removing the paste after treatment, but it may conveniently be presented in bulk form to the rotor element providing the element is not immersed in the paste to any substantial degree. Likewise, because of the fact that a paste cannot be pumped as can a slurry, in most cases it is not feasible to deliver a paste into the path of a rotor element from a nozzle by means of a jet discharged at very high speed, but by means of a properly designed nozzle, a type of jet may be employed such as one which is discharged or extruded at a relatively low speed.

In that adaptation of my process wherein the paste may be presented in bulk form to the rotor element, a convenient method to employ is to mount on a horizontal shaft a vertical rotor element having striking surfaces, and feed the paste on a travelling or screw conveyor into the path of the striking surfaces. The struck material is hurled by the striking surfaces away from and out of their path of rotation. If there is a casing surrounding the rotor element the struck material normally follows the inner contour of the casing until it reaches the discharge opening where it discharges into any suitable container, or may be carried away, as by a screw conveyor.

Any one of a large variety of rotor elements, having striking surface or surfaces of various kinds, located, for example on the end face or faces or on the peripheries of the rotor elements, may be employed in my process. The striking surfaces may be integral or rigidly attached, or need not be, e. g. they may be attached by pins, hinges, or the like, and if desired may swing out, for example, by centrifugal force. While machines embodying any such rotor elements may be used for practicing my invention, I prefer to use a hammer mill. My preferred method of feeding the hammer mill is by a feed, such as a screw conveyor feed arranged radially. I may also use a non-radial feed, but such is usually not so effective as the radial feed. I may also, but in most cases not so advantageously, use a mill employing a circular saw or saws. The latter is known as the "Rafton mill" and is disclosed in my copending application, Serial No. 479,373, filed March 16, 1943, now Patent No. 2,448,049, issued August 31, 1948. (In a Rafton mill, material is introduced into the path of the teeth of a circular saw rotating rapidly in a casing substantially spaced from the saw, and the material after being struck by the teeth of the saw discharges through an outlet in the bottom of the casing.)

Where I employ a circular saw, the teeth may be of any pattern desired, but it will be apparent that teeth with their advancing, i. e. leading, faces on radial planes of the saw at right angles to the planes of rotation of the saw constitute striking surfaces which give the greatest blow to a paste coming into contact therewith, and thus I prefer to use teeth of this type. The rear faces of the teeth are conveniently made sloping away from the leading faces at an angle of approximately 45°. While the teeth may be of any size desired, they may, for example, be ½" apart (or "point to point") and ⅜" from point of tooth to lowest point of the gullet, and the saw may be mounted on a horizontal shaft so that it revolves vertically.

Where I employ a rotor element provided with hammers, as is my preferred practice, I may use any one of a number which are on the market, but I prefer to use the type in which the rotor element consists of a series of spaced parallel discs mounted on a shaft. The hammers may be attached to the discs by short pins on which the hammers swing. The hammers may be attached successively by means of the pins to a series of holes further and further away from the center of the discs as the hammers progressively wear down. I also prefer to use the type of hammer in which the leading faces of the hammers as they swing out make as nearly as possible an unbroken line across the moving element so that substantially all of the paste fed into the path of the moving element is struck directly by the hammers. Such hammers are sometimes referred to as yokes. The more hammers that can be arranged around the periphery of the moving element, the more advantageous the results, and I prefer to use as many as mechanically feasible, considering the diameter of the moving element and the size of the hammers. I also prefer hammers which have flat leading faces, and which leading faces lie, when in operation, in planes radial or somewhere near radial in respect to the rotating element, and preferably at right angles to the planes of rotation of the rotating element.

While I may, in the practice of my invention, employ a conventional hammer mill equipped with a grid or the like over the discharge opening, feeding the paste to it by a screw conveyor for example, such equipment is relatively inefficient because the paste tends quickly to surround the moving element, and power is expended by the hammers in churning around in the paste already struck before it has been expelled through the narrow openings or grid. By eliminating the discharge grid, this difficulty may be obviated. When no grid is employed there is no tendency whatever toward clogging, or the consumption of excessive power, in the practice of my process employing a hammer mill. A conventional hammer mill, but without a grid, is shown in the accompanying drawing.

The accompanying drawing and the detailed description thereof is intended to be illustrative only and not limiting. It shows a front elevational view, in diagrammatic form, of an apparatus, suitable for practicing the invention, comprising a hammer mill to which pigment comprising calcium carbonate in paste form is fed by a screw conveyor arranged substantially radially, the paste being extruded thereby substantially in the form of a cylinder directly into the path of the hammers and discharged through an opening in the mill casing.

In the drawing, casing 10 (having a front and a back, both not shown) is provided with inlet conduit 11 and outlet 12. Inlet conduit 11 is fed by appropriate means, such as inlet 13 (shown in fragmentary form) connected thereto at its further end, and snugly houses screw conveyor 14 mounted on shaft 15, driveable in the direction of the surrounding arrow by any suitable means (not shown), and communicating through casing 10 by means of substantially circular aperture 16 therein. Through the back of casing 10 extends shaft 17 on which is mounted plate 18, here shown as driveable in the direction of the arrow, but which is also driveable in the other direction if desired. Plate 18 is one of two similar plates (the second of which is not shown) spacedly mounted on shaft 17, in holes 19 of which hammers 20 are swivelled on pins 21 which may be integral with hammers 20. In operation, shaft 17 is driven at high speed whereby plate 18, securely affixed thereto, is revolved, thereby in turn revolving, at high speed, hammers 20 which swing out by centrifugal force substantially along radial lines of plates 18. Paste 22 is introduced into inlet 13, advanced in inlet conduit 11 by means of screw conveyor 14, and extruded through aperture 16 substantially as a continuous cylinder (except for possible substantially longitudinal division or divisions therein caused by the flight or flights of screw conveyor 14). Successive small portions or slices of this cylinder of paste 22 are struck off by rapidly revolving hammers 20 and the so-struck paste 23 is discharged through outlet 12. (For greater efficiency aperture 16 may, if desired, be reduced in size to the form of a horizontal slot thereby presenting a ribbon of paste 22 instead of a cylinder to the action of hammers 20.)

Another form of equipment which may be employed in the practice of my process is what is known as a "squirrel cage" disintegrator, which is usually made in the form of two parallel relatively closely disposed discs rotating in opposite directions on the same axis, each disc provided with concentric rows of projections or pins on its face adjacent the other disc, the pins being mounted at right angles to the disc faces, the rows of pins on one disc fitting into annular spaces unoccupied by pins on the other disc, in such a way that when the discs rotate, pins do not strike one another, but rather strike material introduced between the discs, usually at the center of the discs, the material being struck alternately by the pins on either disc as it passes between the discs. Paste may be fed into the space between the discs, for example, by a screw conveyor operating in a hollow shaft of one of the discs, and is then struck repeatedly by the pins, first of one disc and then of the other, and finally is thrown out by centrifugal force from the periphery of the discs from which it may be conveyed away. This or a similar machine may be used in the practice of my invention but it takes a great deal of power, there is some tendency for the paste to stick to the pins, and the peripheral speed at which it is feasible to operate such a machine is not in general as high as in the other forms mentioned, and thus I prefer the hammer mill as described above.

By the employment of a rotor element provided with striking surfaces, preferably a rotor element provided with hammers, or a circular saw or saws if desired, rotating at a peripheral velocity of 30 feet per second, some effect is obtained on a paste of pigment comprising calcium carbonate, but such relatively low peripheral speeds give only relatively minor effects, and I prefer to use much higher peripheral speeds for example, 100, 200, 400 and even 500 feet per second or higher. Where I employ a saw or saws, peripheral speeds of 500 feet per sec. or even higher may be employed with safety, but when I use a rotor element the striking surfaces of which are hammers, it is generally not feasible to employ such a high speed, usually a peripheral speed of 250 to 350 feet per second being as high as it is feasible to operate in safety, although with certain special constructions, higher speed may be used. I therefore prefer to operate at speeds of approximately 400 to 500 feet per second or somewhat higher when using a saw or saws, and at speeds of 250 to 350 feet per second or somewhat higher when using a rotor element provided with hammers.

Whereas subjection of a paste once to striking surfaces gives a decidedly appreciable effect, especially with the higher peripheral speeds, I prefer in most cases, to submit the paste to the striking surfaces a number of times, for example, up to 30 times, usually about 5 to 20 times. I term one subjection to the striking surfaces a "pass."

As an example of the results obtained in the practice of my process, pigment comprising artificially prepared calcium carbonate subjected thereto is reduced in adhesive requirement anywhere from 5 to 50% or more, depending on the material treated, the peripheral speed of the moving element, the number of passes employed, and the other factors involved. With the preferred rotor element, the preferred peripheral speeds, and the preferred number of passes as indicated above, and using pigment comprising artificially prepared calcium carbonate, such as calcium carbonate or calcium carbonate magnesium hydroxide, a 40% to 50% reduction in adhesive requirement is obtained. Under similar conditions, pigment comprising naturally occurring calcium carbonate is reduced to a much lesser degree in adhesive requirement, usually from 5 to 15 or 20% or more. Likewise in the practice of my process, pigment comprising artificially prepared calcium carbonate is reduced in oil absorption anywhere from 5 to 40% or more, depending as before on the material treated, peripheral speed of the rotor element, the number of passes employed, and other factors involved; and similarly pigment comprising naturally occurring calcium carbonate is reduced in oil absorption from 5 to 15% or more; the greater reductions being obtained under the preferred conditions as outlined. It is to be noted that whereas my process gives the greatest effect in connection with pigment comprising artificially prepared calcium carbonate, it gives an effect, although of a considerably lesser degree, with pigment comprising naturally occurring calcium carbonate.

For purposes of illustration, I give below examples of my treatment of subjecting pigment comprising calcium crabonate, in the form of a paste, to a striking action. I employed a hammer mill with hammers having a peripheral velocity of approximately 350 feet per second, with radial screw feed device and with open discharge as shown in the drawing.

Three representative samples in paste form of pigment comprising calcium carbonate were subjected to my treatment. The percent casein requirement and oil absorption of each was determined. Each sample was passed five times through the hammer mill and was then tested for percent casein requirement and oil absorption. The results are shown in the table below:

| Example No. | Sample | Per cent casein requirement | | Per cent reduction in casein requirement, based on the original as 100% | Oil absorption | | Per cent reduction in oil absorption, based on the original as 100% |
| --- | --- | --- | --- | --- | --- | --- | --- |
| | | Original sample | Treated sample | | Original sample | Treated sample | |
| 1 | Calcium carbonate, light grade, made by reacting carbon dioxide and slaked lime | 50 | 25 | 50 | 64.1 | 32.6 | 49 |
| 2 | Same as above, except heavy grade | 32 | 15 | 53 | 46.7 | 29.6 | 37 |
| 3 | Naturally occurring calcium carbonate, marl, best grade | 30 | 19 | 37 | 38.8 | 28.5 | 27 |

As shown in the table, my treatment resulted in a reduction of from 37 to 53% in the casein requirement and a reduction of from 27 to 49% in the oil absorption of the samples.

In carrying out my invention, although I may use paste delivered into the path of the striking surfaces in bulk form, it is more efficient to use a feed in shaped form, such as a continuously advancing cylinder, sheet, ribbon, layer, or the like, of paste; and the thinner the cross section of such cylinder or the like which is subjected to the striking surfaces of the rotating element, the more efficient will be the blow struck, and thus I prefer the thinnest cross section of paste which can readily be introduced into the path of the striking surfaces. As will be understood, a continuous cylinder, sheet, ribbon, layer, or the like of paste cannot be extruded from any given nozzle (which is my preferred method of converting the paste into shaped form), at anywhere near as high a speed as a slurry can be ejected from the same nozzle under the same pressure; but by using a satisfactory pressure, induced for example by the screw conveyor, sufficient speed can be imparted to the extruded paste so that it may be fed with reasonable rapidity to the rotating element, and thus not be driven out of contact by the windage of the rotating element. I prefer to so locate the nozzle or the like extruding the shaped form in which the paste is introduced into the path of the striking surfaces of the rotating element, so that where I use a sheet, ribbon, layer, or the like, the surface of the sheet or the like is in a plane substantially parallel to the striking surface at the time of contact, and also preferably in a plane substantially at right angles to the planes of rotation of the moving element. If the shaped form I use is one or more cylinders, strings, or the like, I prefer to have the longitudinal axes of these cylinders or the like lie in the same plane as described above for the location of the surface of the sheet.

Whereas a large part of the reduction effected in adhesive requirement may usually be obtained in one or a few passes, with only a smaller reduction in subsequent passes, in many cases the maximum effect being obtained in approximately 20 passes, it sometimes happens that the properties of the pigment treated, other than reduction in adhesive requirement, may continue to be enhanced by subjection to further passes, for example, the shine, i. e. gloss imparted to paper. It is thus apparent, at least in coated paper, where although the reduction in adhesive requirement is of great importance, nevertheless improved finish and brightness are also sought after, it is desirable in any given case to determine by trial what number of passes should be given in order to obtain as nearly as feasible the qualities wanted in a pigment in their desired degrees. It appears, as stated, that some of the other properties may continue to undergo modification after the reduction in adhesive requirement has reached its maximum, and in certain cases where the properties sought to be improved continue to improve beyond this point, naturally the treatment would be continued beyond this point so far as desired. For some other uses, for example, when the pigment is to be used as a compounding ingredient in rubber, certain of the properties having significance in coated paper have no significance in rubber, whereas still other properties, important in rubber, may be developed in the pigment by further passes beyond the number of passes which it would be given for use in coated paper manufacture. Thus it is apparent that the least number of passes required to give the maximum reduction in adhesive requirement would not necessarily be the number of passes chosen in any given instance; but rather the number of passes chosen in any given case would be determined by the actual properties developed in the pigment in any given case with relation to the specific requirements of the use to which the pigment was to be put. The cost of processing would also be considered.

As stated above, my process is not only applicable to pastes in the wet form in which they are produced, but also is applicable to pigment comprising calcium carbonate which has been prepared in wet form and then dried, that is to say, the dried pigment may be wet up to form a paste, and then treated in my process. The difference in adhesive requirement between the original dry material (made by drying the wet form) and the paste made therefrom, after treatment, would be, for the same degree of treatment, roughly proportional to the difference in adhesive requirement between the original wet material in paste form and the same paste after treatment.

When using a saw I prefer to use one reasonably thick, or several saws mounted together touching one another on the same shaft. Whereas I can use thinner saws, or a combination of thinner saws, practically I prefer to use a saw thickness of $\frac{1}{4}$ to 1" or more, and preferably at least about 1", so that a fairly wide ribbon, sheet, layer or the like may be offered for striking purposes. Where I use a hammer mill, I usually employ a very much wider piece of apparatus than when employing a saw, because in this case the rotating element, usually not being solid, is much lighter and the width may run anywhere up to several feet or more according to the capacity desired. A rotating element having hammers which will give a 2 foot striking width is very easily obtained, and widths up to 4 or 5 feet are also readily available. The width will depend upon the capacity desired.

Instead of employing merely one such element, that is, a rotor element provided with hammers or a saw, I may use a plurality of such elements, to which the paste may be subjected in series, or in parallel as desired.

In the operation of my process where one pass is employed, I may feed the paste, conveniently by a screw conveyor, into the path of the striking surfaces of a rotor element, and then convey the paste which has been struck out of the system. In the operation of my process where more than one pass is employed, after a given volume of paste has passed through the system once, it may be returned to the inlet of the feed screw conveyor and passed into the path of the rotor element a second time; this procedure may be repeated until a sufficient number of passes have been made.

A convenient way of conducting my process with multiple passes, which is very simple and also effective, is to run the process as a batch process and provide only one hopper for containing the paste. This is my preferred procedure for operating my process as a batch process. A hopper of appropriate size is provided and the paste contained therein may be drawn off as from an opening in the bottom of the hopper into a screw conveyor which feeds the material into the path of the rotor element, and the treated paste discharged from the rotor element is delivered back into the same hopper by an appropriate conveyor. In this way the paste is circulated through the hopper and into the path of the rotor element by the screw conveyor, and thence away by conveyor, or by gravity if the rotor element be appropriately placed, into the original hopper. If feasible, some sort of a slow agitating device may be usefully installed in the hopper. The time required to make one pass is the quotient obtained by dividing the volume of the paste originally introduced into the hopper by the volume per minute discharged by the screw conveyor into the path of the rotor element, and by running the system for the appropriate number of minutes, any number of passes may be made.

The above described procedures and equipment used in operating my invention are illustrative only, and it is to be understood that any suitable apparatus or system of operation, batch or continuous, may be employed as desired.

Inasmuch as a substantial proportion of the energy employed in the process is converted into heat, it is appropriate to take this into consideration in operating the process, and it may be desirable, in certain cases at least, to provide for cooling devices, preferably water jackets and the like.

As indicated in my copending application Serial No. 718,649, it is possible to provide thinning agents to obtain a slurry of a much higher concentration than could otherwise be obtained. Likewise in the use of a paste, it is possible by the use of a thinning agent, of which only a small quantity, say ¼ to several per cent, need be employed, to convert what would otherwise be a crumbly moist powder into a paste condition in which it may be used in my process. Of course I do not employ sufficient water to convert the pigment into a slurry, but only into a paste condition, and by this method I am enabled to utilize in my process paste of a higher dry content than otherwise feasible. I have found there are a number of thinning agents such as for example protein, proteinaceous material, protein-like material or protein derivatives, for instance casein; modified starches such as "Feculose ETO," "Feculose O," "Hercules gum," "Satin gum 35," "Supercote No. 6"; or pectin, dextrin, sodium silicate and the like. A very effective thinning agent, particularly from the standpoint of the use of pigment in coated paper, is casein. Another one is modified starch. If casein is employed, it may conveniently be dissolved in an alkaline solvent and added either to the dry pigment or dry pigment with a small amount of water to moisten it, or to a paste of low water content. Where starch is used it may be added to cold water if it is soluble in cold water, or may be heated with water to place it in solution. It is used similarly to the casein. A thinning action is not merely the result of adding to the pigment the amount of water which may be associated with the thinning agent in question, as the addition of that amount of water in the absence of the thinning agent does not produce a paste from either the dried or the moistened pigment. Other methods of adding a thinning agent may be used, such for example as those disclosed in my copending application last above referred to, with due regard being taken for the fact that a paste is to be produced as the final product rather than a slurry.

Various pigments comprising calcium carbonate according to their composition, physical condition, particle size and the like require different amounts of water to yield a paste as will be readily apparent, and the amount of water employed when using a dry pigment, or a dry pigment which has been moistened, as well as the amount of thinning agent, to reduce it to a paste, can be determined readily by trial with the pigment in question as well as wtih the thinning agent in question. The procedure of using a thinning agent to obtain a paste of a higher concentration than otherwise would be feasible results in an improvement in the efficiency of my process. If any foam tends to be generated in my process, an anti-foam agent may be used, of which there are a large number on the market. Pine oil is one which may very conveniently be employed, usually only a very small amount, say from .01 to 1% on the dry weight of the pigment being necessary.

It will be understood of course that as large a percentage of casein or other thinning agent as desired may be employed with the pigment to be treated by my process providing the water is restricted so that a paste is obtained, and if the thinning agent is an adhesive such as casein or starch, this may be sufficient in amount for employment with the pigment in the final use to which the pigment is to be put. This of course includes the treatment by my process of a pigment paste which, after appropriate dilution if required, and/or addition of other ingredients, may be used for coating paper.

Thus it is apparent that in my process I may use a paste comprising water and pigment which comprises calcium carbonate, and that this paste may include any one or all of the following in any desired amount: thinning agent, adhesive, anti-foam agent, other pigment, as well as any other ingredient used in a mix for coating paper, if the mix is to be used for coated paper. Likewise any paste may be employed which comprises pigment comprising calcium carbonate which may constitute an industrial mix to be used for some other purpose, or any part of that mix. However, such a method of operation is not my preferred procedure as it is usually less convenient, is wasteful of power, and reduces the efficiency of my process, among other reasons because of the presence of other material, and my preferred method is thus to employ as concentrated a paste as is feasible of the pigment comprising calcium carbonate, and in many cases I find this conveniently accomplished by the employment of a small percentage of thinning agent. The paste after subjection to my treatment may then be utilized for the use desired, directly or after any further treatment desired, and after the addition of any further quantities of ingredients which may be desired. I may of course, if desired, employ in my process a paste comprising pigment which comprises calcium carbonate and water in combination with other liquid, or I may employ in my process a paste comprising pigment which comprises calcium carbonate and liquid, other than water, for example oil or other organic liquid.

I may, if desired, carry out my process either at atmospheric, superatmospheric or subatmospheric pressure, that is, in respect to the pressure of the gas, such as air, surrounding the rotor element. Superatmospheric pressure surrounding it would appear to give no decided advantage, but subatmospheric pressure is doubtless of some advantage owing to a lessening of or removal of air resistance to the rotor element and by permitting better striking of the paste by the striking surfaces of the rotor element by reducing or eliminating any film of air between these surfaces and the paste. However, this involves mechanical complications and considerable extra expense, especially when dealing with warm pastes. I therefore prefer to operate substantially at atmospheric pressure in respect to the space surrounding the rotor element; however, owing to a fan-like action of the rotor element, there is usually a slight induced pressure in the space surrounding its periphery, which raises the pressure near its periphery slightly above atmospheric.

By utilizing pigment comprising artificially prepared calcium carbonate processed according to my invention, coated paper may be obtained which has a strong coating, although there is used substantially less, for example, about 5 to 50% less, adhesive than is required to obtain a strong coating on paper when using the same pigment prior to treatment by my process, and in some cases even a greater percentage reduction of adhesive requirement is indicated. The coated paper produced possesses also, among other characteristics, a markedly improved gloss or finish, as well as a markedly improved whiteness and brightness. When using pigment comprising naturally occurring calcium carbonate, lesser but still substantial reductions in adhesive requirement may be obtained, in certain cases up to 25% or more, as well as a marked improvement in the spreading qualities of the pigment.

The adhesive most widely used in coated paper is casein (derived from milk) and the reduction in adhesive requirement which may be obtained by my process applies, of course, to reduction in casein requirement. Similar percentage reduction in adhesive requirement of pigment comprising calcium carbonate processed by my invention may be obtained with other adhesives employed in the paper coating industry such as starch, either unmodified, or more usually in some modified form, glue, gums, or protein, proteinaceous, protein-like or protein containing adhesive derived from other sources such as soya bean, corn (zein), and the like, casein (derived from milk) in modified, combined or soluble form, as well as other materials useful as adhesives in coated paper.

Pigment comprising calcium carbonate processed as described herein may also be advantageously used as a filler in the manufacture of filled paper. The indications are that filled paper produced with my processed pigment comprising artificially prepared calcium carbonate is more opaque than is paper made with the same pigment without processing, that a better finish is obtained, and that in some cases dusting is lessened or avoided. It may be stated in this connection that in certain instances, notably with paper having groundwood furnishes run on high speed paper machines, a certain amount of dusting has been experienced on the calenders, winders and rewinders with paper in which pigment comprising artificially prepared calcium carbonate of certain characteristics has been used as filler. This dust has been found to contain fibre as well as calcium carbonate. The indications are that the herein described processing of the pigment in question lessens or avoids this difficulty, resulting in an improved manufacturing process as well as an improved paper.

Moreover, filled paper hitherto produced with pigment comprising calcium carbonate always has had a more or less "chalky" feel, which in some cases has been very objectionable. There are indications that paper made with pigment comprising calcium carbonate processed as described herein possesses a lesser degree of chalky feel than has been the case with any previously produced paper filled with pigment comprising calcium carbonate, if in fact it does not entirely lack the usual chalky feel.

Pigment comprising calcium carbonate processed as herein described may also be employed in paints and enamels or the like, as well as in rubber, plastics, and similar materials. Likewise pigment comprising calcium carbonate processed as described herein may be employed in cold water paints to give more opaque, better spreading, and smoother paint films than obtained with the use of the same pigment comprising calcium carbonate prior to treatment.

I have not yet determined the cause or causes of the outstanding modification of the properties of pigment comprising calcium carbonate brought about by its subjection to my process, but my theory is that it is due to some change which takes place in the surface characteristics of the individual particles. It may be that the physical, chemical, electrical, or other condition of the pigment particles has been altered. As to particle size, there appears to be little, if any, reduction occurring in my process. Thus my process is in no sense a grinding process, and if any comminution of particle size occurs, it is purely incidental, as any comminution of particle size, at least in the ranges of comminution which might conceivably take place in my process, can in no way account for the change in properties brought about by my process. As a matter of fact it is usually desired to maintain the original characteristic as to particle size of the original pigment treated, so as to retain this desirable feature of the original pigment, and improve the pigment by the newly acquired properties, and this is what normally occurs in my process.

It is of course well known to treat materials in hammer mills to comminute them or break down aggregates therein, but as stated, this is not the process which I employ. Furthermore such comminution operations for the most part take place on dry material. So far as I know, no pigment comprising calcium carbonate has ever been treated in the prior art in a hammer mill to change its properties, such as adhesive requirement and the like, nor has such pigment in paste form been treated therein with the results disclosed herein. So far as I know, no one has ever observed that any modification of properties could take place in treating a paste of the kind herein described in the manner I treat it, prior to my invention thereof.

The word "paste" covers a broad range of material condition. At the one extreme, i. e., the one bordering on the solid condition, I mean it to be limited by the condition of any material which is in crumbly form and does not, in the absence of pressure, form a coherent whole. For example, in adding water or other liquid to a dry comminuted solid, the solid becomes gradually moistened and finally some of the particles adhere together into crumbs. Just beyond this state, if more liquid is added, the material is converted to a coherent plastic condition. At the other extreme, i. e., the one bordering on the liquid condition, I mean it to be limited by the condition of any material which is capable of being pumped commercially in the customary pumps, that is to say, if the material can be pumped by the customary pumps, it is considered a liquid. Of course, in the group of such pumps, I do not mean to include a screw or worm conveyor by which a paste can be conveyed, but rather refer to the usual types of pumps, including those which can pump very viscous liquids such as the "Blackmer" pump, which is a swing bucket type, and the "Moyno" pump which is a helical type. Thus where I use the word "paste" herein I mean it to include any condition in which the pigment-liquid mixture occurs from the point where it has just ceased to be crumbly and becomes coherent without pressure, down to the point where it just lacks that quality of flow whereby it would be enabled to be pumped by the ordinary pumps employed for very viscous liquids.

As will be apparent, any rotor element, such for example as a circular saw or a rotor element having hammers connected thereto, has an infinite number of planes of rotation which pass through the element, all of which are parallel, and at right angles to the axis of rotation of the element.

Where in the claims I use the word "hammer," I mean any member adapted for striking connected to a rotor element.

Where herein and in the claims, I speak of the "peripheral velocity" of a rotor element, I mean the velocity of the outer ends of the striking members thereof such as hammers in the case of a rotor element having hammers, and teeth in the case of a circular saw, and the like.

As is clearly evident, where, herein and in the claims, I use the word "element," I mean the whole unit employed, and not merely a part thereof; and where I use the word "member," e. g. as of an "element," I mean a part thereof, either integral or connecting therewith.

In this specification I have advanced one or more theories as partial or complete explanation of various conditions and effects, but it is to be distinctly understood that the scope of my invention is independent of theory, and that my invention is not limited or affected by the above theories or any of them, or by their validity or invalidity, as regardless of these or any other theories, the results are as stated herein.

While machines and certain broad methods of treatment of material are disclosed herein, no claims thereto are made herein, said subject matter being likewise disclosed in my copending application Serial No. 479,373, filed March 16, 1943, now Patent No. 2,448,049, issued August 31, 1948, disclosing and claiming machines and methods wherein a jet or jets is or are struck by a rotor element, said copending application being a continuation in part of the application of which the present application is a continuation in part.

Cross reference is hereby made to my copending application Serial No. 706,907, filed October 31, 1946.

While I have described in detail the preferred embodiment of my invention, it is to be understood that the details of procedure, the proportions of ingredients, the arrangement of steps, and the mechanical devices used, are presented for purposes of illustration only, and may be widely varied without departing from the spirit of my invention or the scope of the subjoined claims.

I claim:

1. In the treatment of a pigment comprising calcium carbonate, the method of modifying said pigment to effect an improvement in at least one of the properties of adhesive requirement, oil absorption and gloss-imparting quality of said pigment, which comprises directing paste comprising said pigment into the path of travel of a percussive member of a rotor element, said paste being in coherent condition when at atmospheric pressure and capable of being conveyed by a screw conveyor, subjecting said paste to a percussion from said percussive member, said percussive member having a velocity of not less than 30 feet per second at the point of said percussion, said rotor element at the time of subjecting said paste to the action of said percussive member being free from contact with said paste except in respect to said percussive member, said paste being free for movement upon, and at the point of, said percussion, said paste being propelled by said percussive member away from and out of the path of travel of said percussive member.

2. The method of modifying a pigment comprising calcium carbonate which comprises directing paste comprising said pigment into the path of travel of percussive members of a rotor element, said paste being in coherent condition when at atmospheric pressure and capable of being conveyed by a screw conveyor, subjecting said paste to percussions from said percussive members, said percussive members having a velocity of not less than 30 feet per second at the points of said percussions, said rotor element at the time of subjecting said paste to the action of said percussive members being free from contact with said paste except in respect to said percussive members, said paste being free for movement upon, and at the points of, said percussions, said paste being propelled by said percussive members away from and out of the path of travel of said percussive members, redirecting the thus treated paste into the path of travel of said percussive members, and resubjecting it to the action of said percussive members a sufficient number of times to effect a reduction in the adhesive requirement of said pigment of not less than one-tenth of the original value of said property.

3. A process according to claim 2 in which said pigment comprises artificially prepared calcium carbonate.

4. A process according to claim 2 in which said paste comprises said pigment and water, and said percussive members are swung out by centrifugal force.

5. A process according to claim 2 in which said paste comprises said pigment and water, said percussive members are teeth, and said rotor element is a circular saw.

6. A process according to claim 2 in which said percussive members have a velocity of not less than 100 feet per second at the points of said percussions.

7. A process according to claim 2 in which said percussive members have a velocity of not less than 200 feet per second at the points of said percussions.

8. A process according to claim 2 in which said percussive members have a velocity of not less than 400 feet per second at the points of said percussions.

9. In the treatment of a pigment comprising calcium carbonate, the method of modifying said pigment to effect an improvement in at least one of the properties of adhesive requirement, oil absorption and gloss-imparting quality of said pigment, which comprises directing paste comprising said pigment into the path of travel of hammers of a rotor element, said paste being in coherent condition when at atmospheric pressure and capable of being conveyed by a screw conveyor, subjecting said paste to percussions from said hammers, said hammers having a peripheral velocity of not less than 100 feet per second at the points of said percussions, said rotor element at the time of subjecting said paste to the action of said hammers being free from contact with said paste except in respect to said hammers, said paste being free for movement upon, and at the points of, said percussions, said paste being propelled by said hammers away from and out of the path of travel of said hammers.

10. A process according to claim 9 in which said paste is introduced into the path of said hammers in shaped form.

11. In the treatment of a pigment comprising calcium carbonate, the method of modifying said pigment to effect an improvement in at least one of the properties of adhesive requirement, oil absorption and gloss-imparting quality of said pigment, which comprises directing paste comprising said pigment into the path of travel of teeth of a circular saw rotating at a peripheral velocity of not less than 100 feet per second, said paste being directed from beyond the periphery of said saw toward the center of rotation thereof, said paste being in coherent condition when at atmospheric pressure and capable of being conveyed by a screw conveyor, subjecting said paste to percussions from said teeth, said circular saw at the time of subjecting said paste to the action of said teeth being free from contact with said paste except in respect to said teeth, said paste being free for movement upon, and at the points of, said percussions, said paste being propelled by said teeth away from and out of the path of travel of said teeth.

12. A process according to claim 11 in which said paste is introduced into the path of said teeth in shaped form.

HAROLD R. RAFTON.

REFERENCES CITED

The following references are of record in the file of this patent:

UNITED STATES PATENTS

| Number | Name | Date |
|---|---|---|
| 1,711,464 | Ruffrecht et al. | Apr. 30, 1929 |
| 1,764,020 | Hopkins | June 17, 1930 |
| 1,872,891 | Church | Aug. 23, 1932 |
| 2,182,096 | Roderick | Dec. 5, 1939 |
| 2,210,835 | Jones et al. | Aug. 6, 1940 |
| 2,323,877 | Turbett | July 6, 1943 |